United States Patent [19]
Glover

[11] Patent Number: 5,136,518
[45] Date of Patent: Aug. 4, 1992

[54] PITCH GUIDANCE SYSTEM

[75] Inventor: J. Howard Glover, Bellevue, Wash.

[73] Assignee: Sundstrand Data Control, Inc., Redmond, Wash.

[21] Appl. No.: 505,214

[22] Filed: Apr. 4, 1990

Related U.S. Application Data

[63] Continuation-in-part of Ser. No. 180,218, Apr. 11, 1988, abandoned.

[51] Int. Cl.⁵ .................................................. G06F 15/50
[52] U.S. Cl. ................................ 364/433; 244/181; 364/435
[58] Field of Search .......................... 364/433–435, 364/427; 244/181, 182; 340/966, 968

[56] References Cited

U.S. PATENT DOCUMENTS

| | | | |
|---|---|---|---|
| 3,688,175 | 8/1972 | Rauschelbach | 244/181 |
| 3,744,309 | 7/1973 | Astengo | 244/181 |
| 3,822,047 | 7/1974 | Schuldt, Jr. | 364/427 |
| 3,945,590 | 3/1976 | Kennedy, Jr. et al. | 364/427 |
| 3,967,799 | 7/1976 | Muller | 244/181 |
| 4,235,104 | 11/1980 | Hoadley et al. | 73/180 |
| 4,326,253 | 4/1982 | Cooper et al. | 364/435 |
| 4,347,572 | 8/1982 | Berwick, Jr. et al. | 364/433 |
| 4,390,950 | 6/1983 | Muller | 364/434 |
| 4,422,147 | 12/1983 | Hanke | 364/440 |
| 4,442,490 | 4/1984 | Ross | 364/433 |
| 4,485,446 | 11/1984 | Sassi | 364/435 |
| 4,536,843 | 8/1985 | Lambregts | 364/434 |
| 4,589,070 | 5/1986 | Kyrazis | 340/968 X |
| 4,590,475 | 5/1986 | Brown | 340/966 |
| 4,593,285 | 6/1986 | Miller et al. | 340/968 |
| 4,609,987 | 9/1986 | Greene | 364/433 |
| 4,725,811 | 2/1988 | Muller et al. | 340/968 X |
| 4,728,951 | 3/1988 | Johnson et al. | 340/968 |
| 4,763,266 | 8/1988 | Schultz et al. | 364/433 |
| 4,786,905 | 11/1988 | Muller | 340/975 |
| 4,787,042 | 11/1988 | Burns et al. | 244/181 |
| 4,797,674 | 1/1989 | Zweifel et al. | 340/968 |
| 4,841,448 | 6/1989 | Ford | 364/433 |
| 4,891,642 | 1/1990 | Muller | 364/433 |
| 4,947,164 | 8/1990 | Bateman | 364/433 |

Primary Examiner—Thomas G. Black
Attorney, Agent, or Firm—Mason, Kolehmainen, Rathburn & Wyss

[57] ABSTRACT

A pitch guidance system for an aircraft utilizes inertially derived pitch information to provide the pilot with information defining the optimum pitch angle for maximum climb during a wind shear condition. The system utilizes a pitch reference modulator that receives a stall warning discrete from a stall warning system to reduce the commanded pitch angle upon the occurrence of a stall warning to reduce the possibility of stalling the aircraft during degraded performance conditions such as tail winds and engine-out conditions. The system utilizes inertially derived pitch information rather than air mass derived angle of attack information to avoid transients in the angle of attack vane signal, and the commanded pitch angle is biased as a function of altitude and vertical speed to optimize the pitch angle for different altitudes and descent rates.

32 Claims, 2 Drawing Sheets

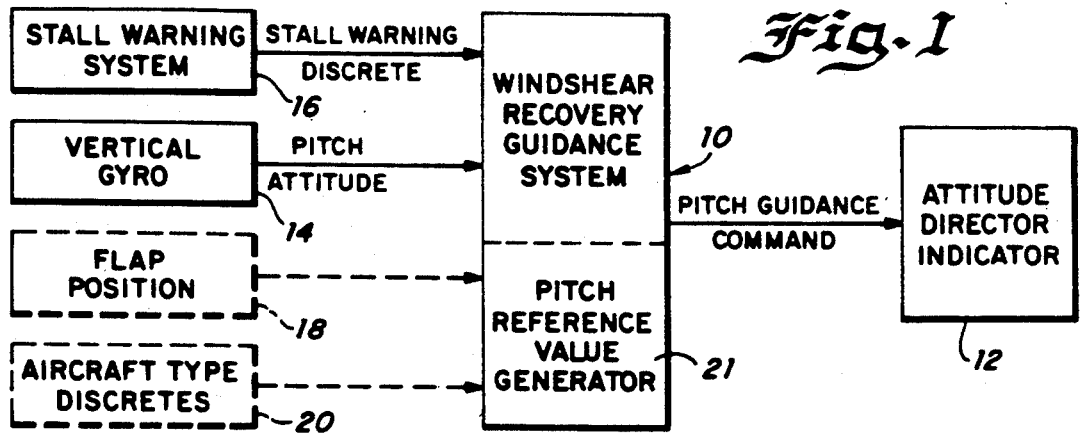
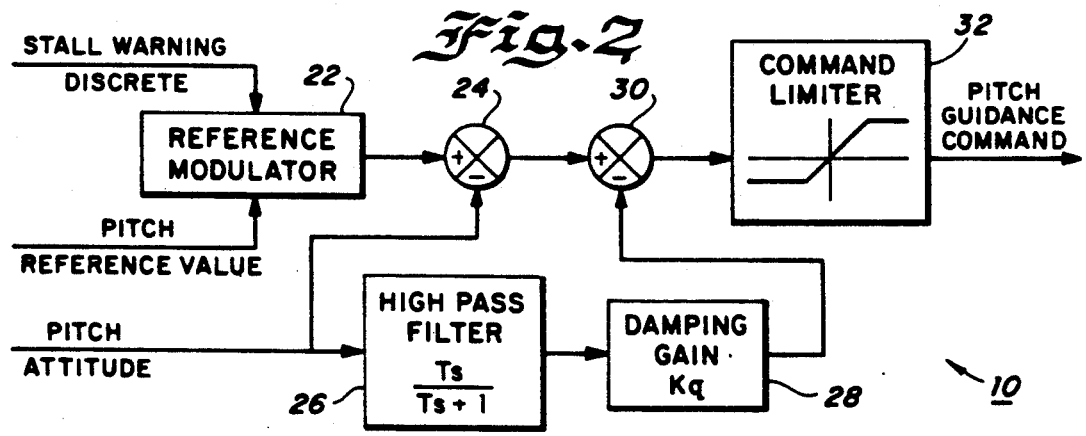
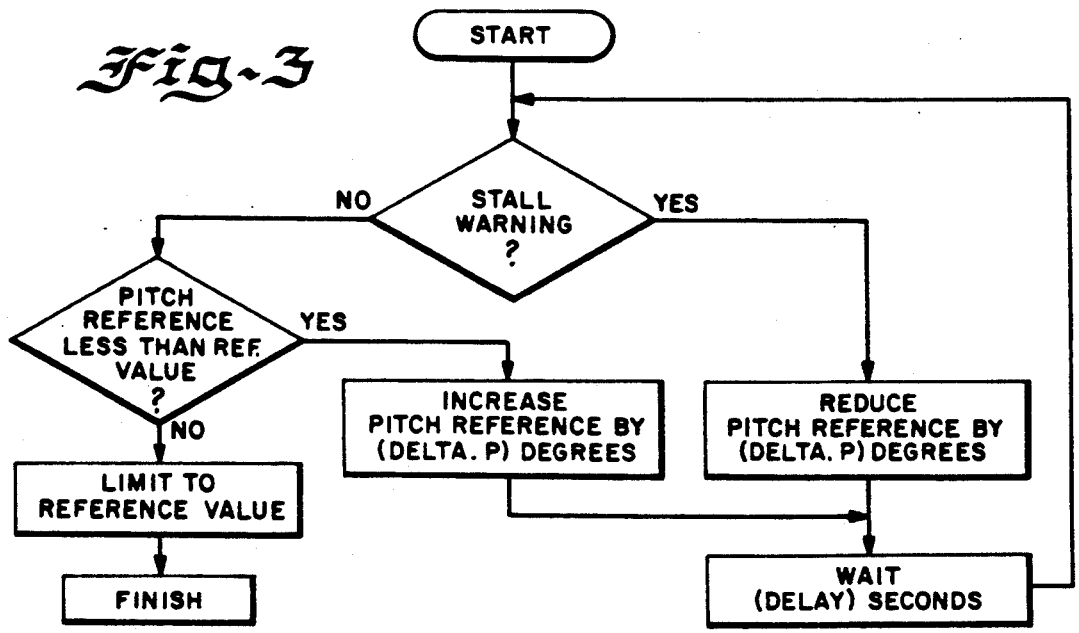

PITCH GUIDANCE SYSTEM

CROSS REFERENCE TO RELATED APPLICATION

This application is a continuation-in-part of copending U.S. patent application Ser. No. 07/180,218, filed Apr. 11, 1988 and now abandoned.

BACKGROUND OF THE INVENTION

This invention relates generally to aircraft pitch guidance systems, and more particularly to wind shear recovery systems with stall protection.

PRIOR ART

Aircraft pitch guidance systems for guiding a pilot during a wind shear condition are known. One such system is disclosed in U.S. Pat. No. 4,347,572 to Berwick, Jr., et al. The Berwick, Jr., et al. system utilizes various inputs including air mass derived signals such as the angle of attack signal derived from an angle of attack vane to provide the pilot of an aircraft with a guidance signal defining the maximum climb rate obtainable without stalling the aircraft. However, while the system disclosed in the Berwick, Jr., et al. patent does provide guidance to a pilot, because the system utilizes air mass derived signals, it is responsive to turbulence often encountered in a wind shear condition and such turbulence can cause an oscillatory guidance signal which, if responded to by the pilot, can cause pilot induced oscillation of the aircraft about its pitch axis.

SUMMARY OF THE INVENTION

Accordingly, it is an object of the present invention to provide a pitch guidance system that overcomes many of the disadvantages of the prior art systems.

It is another object of the present invention to provide a pitch guidance system that utilizes inertially derived signals to avoid the effects of turbulence on air mass derived systems.

It is yet another object of the present invention to provide a pitch guidance system that utilizes a pitch angle reference modulator that modulates the optimum pitch angle as a function of a stall warning signal.

Thus, in accordance with a preferred embodiment of the present invention, the pitch attitude of the aircraft is compared with a pitch reference signal to provide a pitch guidance command signal to the pilot that defines the optimum pitch angle required for maximum climb during a wind shear condition. The pitch reference value is modulated by a stall warning discrete upon the occurrence of a stall warning to reduce the pitch guidance command signal during a stall warning to prevent the pilot from attaining a pitch attitude capable of causing a stall. Upon cessation of the stall warning, the pitch guidance command signal is again increased toward the pitch reference value to permit the pilot to increase the pitch attitude to the reference value. The pitch reference value is also modulated as a function of altitude and descent rate to increase the pitch reference at low altitudes and high descent rates.

DESCRIPTION OF THE DRAWING

These and other objects and advantages of the present invention will become readily apparent upon consideration of the following detailed description and attached drawing, wherein:

FIG. 1 is a functional block diagram of the pitch guidance system as deployed in an aircraft;

FIG. 2 is a functional block diagram of the pitch guidance system according to the invention;

FIG. 3 is a logical flow diagram illustrating the operation of the pitch angle reference modulator utilized in the pitch guidance system according to the invention.

DETAILED DESCRIPTION

Figure 4:
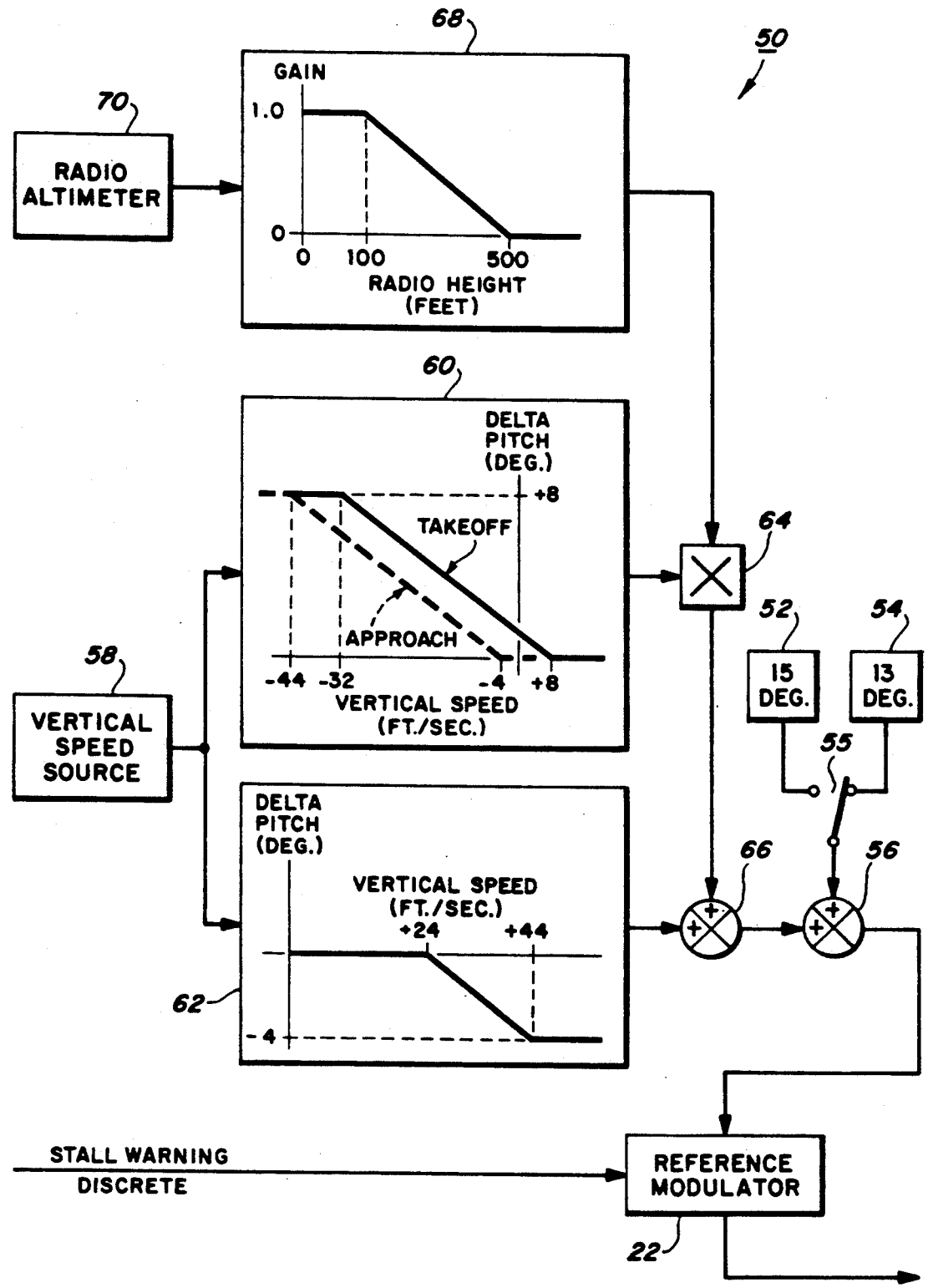
FIG. 4 is a functional block diagram showing additional inputs to the pitch guidance system of FIG. 2 to optimize the pitch guidance signal for different altitudes and descent rates.

The system according to the invention is particularly suitable for providing guidance commands to the pilot of an aircraft to advise him of the optimum pitch attitude required for recovery from a wind shear condition. Thus, the system may be utilized in conjunction with a wind shear detector, for example, by a wind shear, detector of the type disclosed in U.S. Pat. No. 4,891,642, filed Jan. 11, 1988, by Hans R. Muller, and the pitch guidance provided by the system followed by the pilot upon the detection of a wind shear by the wind shear detector.

When a severe wind shear is detected, it is necessary for the pilot to execute a recovery maneuver to maintain adequate terrain clearance while still maintaining an adequate stall margin. This maneuver requires immediate application of maximum available engine thrust, and rotation of the aircraft about its pitch axis to an attitude that causes the aircraft to climb, while at the same time insuring that the angle of attack does not increase so much that the aircraft is in danger of stalling. Lateral control of the aircraft should simultaneously be applied to maintain wings-level flight. This operation is demanding on a pilot's skills, and it is the purpose of the present invention to give the pilot assistance in the form of commands from the attitude director.

The primary requirement of pitch guidance control is that the system should assist the pilot in arresting the descent of the aircraft, while at the same time maintaining adequate stall margin. In extreme cases, where loss of aircraft energy due to wind shear is very large, the guidance system must adjust the pitch attitude such that the distribution of energy between potential energy (altitude) and kinetic energy (air speed or angle of attack) reflects the immediate requirements. For example, if the aircraft is very close to the terrain, then the guidance must emphasize potential energy (climb performance), while if there is adequate terrain clearance, then the emphasis must be placed on maintaining kinetic energy (stall margin).

The pitch guidance commands must not allow the aircraft to stall. However, the nature of severe wind shear is such that it is very likely that severe turbulence will be encountered by the aircraft during the recovery maneuver. One effect of this turbulence may be to cause the stall warning system to generate a stall warning even though the warning is caused by momentary increases in the measured angle of attack caused by the turbulence that can be tolerated. However, a normal trained response of the pilot to a stall warning is to reduce the pitch attitude of the aircraft in order to reduce the angle of attack below the stall warning threshold value. However, in the event of a transient increase in the angle of attack caused by turbulence, it is undesirable that the pilot allow the pitch attitude to decrease by a large amount, since the response of the aircraft to a control input by the pilot is considerably slower than the response of the angle of attack sensor to the atmospheric turbulence. If the guidance system is excessively dependent on stall warning, it is possible that the inherent lag in controlled response will result in a pilot induced oscillation of the aircraft.

For the reasons discussed above, the system should not be totally reliant upon data from sensors which are themselves likely to be adversely affected by atmospheric disturbance during severe wind shears. Thus, it is desirable to use other sensors such as radio altimeters and vertical speed sensors that are not affected by atmospheric disturbances.

Referring now to the drawing, with particular attention to FIG. 1, there is illustrated a wind shear recovery guidance system 10 that provides a pitch guidance command signal to a pilot via an attitude director indicator 12 which may be an aural or visual indicator such as a gauge or a cathode ray tube. The wind shear recovery guidance system 10 receives signals from a vertical gyro 14 that provides a signal representative of the pitch attitude of the aircraft, i.e., the angle of the longitudinal axis of the aircraft relative to the horizon. Other inputs to the wind shear recovery guidance system 10 include a stall warning system 16, a flap position discrete 18 and other discretes 20 which may include signals representative of the type of aircraft carrying the system and other aircraft parameters such as, for example, landing gear position.

The stall warning system 16 may be a conventional stall warning system, sometimes known as a "stick shaker" that monitors various aircraft parameters such as angle of attack and airspeed and provides a warning to the pilot in the event of an impending stall condition. The stall warning may be communicated to the pilot in a variety of ways, one way being a physical vibration of the aircraft's control, hence the term "stick shaker". In addition, flap position and other aircraft parameters affect the optimum pitch angle required for maximum climb of the aircraft, and hence, signals representative of flap position and aircraft type discretes are provided to the wind shear recovery guidance system 10 from the flap position discrete 18 and the aircraft type discretes 20. The aircraft type discretes define the type of aircraft that is carrying the system and the optimum pitch angles for maximum climb under various flight configurations. Typically, the optimum pitch angle for maximum climb is on the order of approximately 15 degrees for modern commercial aircraft. The guidance system 10 includes a pitch reference value generator 21 that responds to the aircraft type discretes and the flap position signal to provide a pitch reference value based on the type of aircraft and its flap position. The pitch reference value generator may take various forms such as, for example, a look-up table that has stored therein pitch reference values for various aircraft under various flap settings or a computation system that has stored therein a reference value for a particular aircraft and modifies this value as a function of flap setting.

The pitch guidance system 10 is illustrated in greater detail in FIG. 2. The pitch guidance system 10 provides a pitch guidance command signal to the attitude director indicator 12 based on the pitch attitude of the aircraft, the pitch reference value which, as stated above, is determined by various parameters including the performance characteristics of the aircraft as defined by the aircraft type discretes 20 and aircraft configuration parameters such as flap position as obtained from the flap position discrete 18.

The pitch reference value is operated on by a reference modulator 22 under the control of the stall warning discrete from the stall warning system 16. The operation of the reference modulator 22 will be described in greater detail in conjunction with FIG. 3, but briefly, the reference modulator 22 operates on the pitch reference value to reduce the pitch reference value upon the occurrence of a stall warning. The pitch reference value as modified by the stall warning discrete is applied to a comparator 24 that compares the present pitch attitude of the aircraft as obtained from the vertical gyro 14 with the modulated pitch reference value to provide a signal representative of the deviation of the present pitch attitude of the aircraft from the modulated pitch reference value. High frequency components of the pitch attitude signal from the vertical gyro 14 are passed through a high pass filter 26 (having a time constant of, for example, on the order of 2 seconds) and an amplifier 28. The amplified high frequency signals from the amplifier 28 are subtracted from the output of the comparator 24 by a summing junction 30 to provide a damped pitch error signal to a command limiter 32. The command limiter 32 limits the amplitude of the signal from the summing junction 30 to a value selected to avoid over controlling the aircraft, for example, to a range of zero to +20 degrees.

The logical operation of the reference modulator 22 is illustrated in FIG. 3. The reference modulator monitors the pitch attitude signal from the vertical gyro 14 in conjunction with the pitch reference value and the stall warning discrete to adjust the pitch guidance command signal as required relative to the pitch reference value and the stall warning discrete. As is illustrated in FIG. 3, the system first determines whether or not there is a stall warning. If there is no stall warning, the system determines whether the pitch reference signal is less than the reference value. If not, the output of the reference modulator is simply limited to the pitch reference value. If the pitch reference signal is less than the reference value, the pitch command is increased by a predetermined number of degrees, for example, two degrees. After a delay of a predetermined number of seconds, for example, two seconds, the process is repeated, beginning with a determination of whether a stall warning is present.

If a stall warning is present, then the pitch guidance command signal is reduced by a predetermined number of degrees, for example, two degrees, and after the predetermined time delay, the presence of a stall warning is monitored. If the stall warning is still present, the pitch guidance command signal is again reduced, but if not, the pitch guidance command signal is increased until it reaches the pitch reference value.

In the system illustrated in FIG. 4, the reference modulator 22 modulates a total pitch reference signal that is obtained from a combination of signals rather than a fixed pitch reference signal as a function of whether or not a stall warning is present. The system 50 of FIG. 4 utilizes one of two fixed reference pitch signals depending on whether the aircraft is in a takeoff or an approach mode. In the takeoff mode, a pitch reference source 52 provides a signal representative of a 15° pitch reference, while in the approach mode a pitch reference source 54 provides a 13° pitch reference. The takeoff or approach reference source is selectable by a switch 55 that selects either the takeoff pitch reference 52 or the approach pitch reference 54 depending upon whether the aircraft is in a takeoff or approach mode. The selection may be made manually, or preferably automatically by switching circuitry that monitors various aircraft flight parameters such as flap position, landing gear position, engine power, airspeed and other parameters to automatically determine the mode of operation of the aircraft. The reference signal from one of the sources 52 and 54 is applied to a summing junction 56 that sums it with various biasing signals that are determined by the altitude of the aircraft above ground and the vertical speed of the aircraft.

The vertical speed of the aircraft is obtained from a vertical speed source 58 that provides a signal representative of the vertical speed of the aircraft. Preferably, the vertical speed is obtained from a source that is not dependent on air data to avoid errors induced by turbulence that often accompanies wind shear. Preferably, the vertical speed source 58 may include an inertial navigation system that provides an inertially derived Z-velocity signal.

In a wind shear condition, if an aircraft has a negative (descending) vertical speed, it is more susceptible to the effects of downdrafts and negative shears than an aircraft having a positive vertical speed. Consequently, the vertical speed is monitored, and if the vertical speed is less than +8 feet per second, the pitch reference is increased. If the vertical speed is positive, the pitch reference is decreased. This is accomplished by a pair of function generators 60 and 62. The function generator 60 is operative for low positive vertical speeds and negative vertical speeds and serves to increase the pitch reference for vertical speeds below +8 feet per second. For example, between +8 feet per second and −32 feet per second during the takeoff mode, the pitch reference is increased by +8°. In the approach mode, the pitch reference is increased from 0° at a vertical speed of −4 feet per second to +8° at a vertical speed of −44 feet per second. Thus, the function generator 60 provides a pitch bias signal to a multiplier 64 that is a function of the vertical speed signal from the vertical speed source 58. Similarly, the function generator 62 monitors the vertical speed from the vertical speed source 58 and decreases the pitch angle reference by up to −4° at vertical speeds between +24 and +44 feet per second. The reduction in the pitch reference under high vertical speed conditions serves to reduce nuisance commands when the aircraft has sufficient vertical speed, or kinetic energy, to withstand a wind shear without increasing the pitch angle. The pitch bias signal from the function generator 62 is applied to a summing junction 66 and combined with the output of the function generator 60 that is applied to the summing junction 66 via a multiplier circuit 64. The combined bias signals from the summing junction 66 are applied to the summing junction 56 to provide the total reference signal to the reference modulator 22 which operates as it does in FIG. 2.

As discussed above, the function generators 60 and 62 bias the total pitch reference signal applied to the reference modulator 22 as a function of the vertical speed of the aircraft by increasing the pitch reference at negative vertical speeds and decreasing it at positive vertical speeds.

When the aircraft is near the ground, it is desirable to increase the pitch reference as dictated by the function generator 60, particularly when negative vertical speeds are present, because climb performance is more important than maintaining kinetic energy when the aircraft is close to terrain. Consequently, the output of the function generator 60 is modulated by the multiplier 64 as a function of the altitude of the aircraft above the ground. The modulation is accomplished by a function generator 68 that monitors the output of a radio altimeter 70 and reduces the effect of the function generator 60 as a function of radio altitude. For example, below altitudes of 100 feet above ground, the function generator 68 applies a gain signal having a magnitude of 1 to the multiplier 64. Thus, the full pitch bias signal generated by the function generator 60 is applied to the summing junction 66 (via the multiplier 64) so that it may fully modulate the total pitch reference signal applied to the reference modulator 22. Thus, at low levels, the pitch angle may be increased by up to 8° over the basic pitch command signal to thereby trade kinetic energy for altitude. Above altitudes of approximately 100 feet above the terrain, the achievement of the maximum climb rate is not as critical as it is below 100 feet, and it is desirable to conserve kinetic energy to avoid a potential stall situation. Thus, the function generator 68 gradually reduces the gain signal from a factor of 1 at 100 feet of radio altitude to 0 at a radio altitude of 500 feet. Thus, once the aircraft has reached an altitude of 500 feet or more above the terrain, the positive pitch bias provided by the function generator 60 no longer affects the total pitch reference signal.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A pitch guidance system for an aircraft, comprising:
   means for providing a pitch angle reference signal representative of the optimum pitch angle for maximum climb of the aircraft;
   means for providing a signal representative of the vertical speed of the aircraft;
   means for providing a signal representative of the pitch angle of the aircraft;
   means responsive to said pitch angle signal and said pitch angle reference signal for providing a pitch guidance signal for manuevering the aircraft; and
   means responsive to said vertical speed signal and said pitch angle reference signal for modifying said pitch angle reference signal in accordance with the vertical speed signal.

2. A pitch guidance system as recited in claim 1 wherein said pitch angle reference signal modifying means includes means for increasing the pitch angle reference signal upon the occurrence of a vertical speed signal indicative of a descent of the aircraft.

3. A pitch guidance system as recited in claim 2 wherein said pitch angle reference signal is representative of a pitch angle on the order of 13 to 15 degrees and wherein said pitch angle reference signal is increased by up to 8 degrees for vertical speeds in excess of a descent rate of 32 feet per minute.

4. A pitch guidance system as recited in claim 2 further including means for providing a signal representative of the altitude of the aircraft, said pitch angle reference signal modifying means being responsive to said altitude representative signal for reducing the amount the pitch angle reference signal is increased as the altitude of the increases.

5. A pitch guidance system as recited in claim 2 wherein said pitch angle reference signal modifying means includes means for decreasing the pitch angle reference signal upon the occurrence of a vertical speed signal indicative of the ascent of the aircraft.

6. A pitch guidance system as recited in claim 5 wherein the pitch angle reference signal is reduced by up to 4 degrees for ascent rates 44 feet per second.

7. A pitch guidance system as recited in claim 1 further including means for providing a signal representative of the pitch attitude of the aircraft.

8. A pitch guidance system as recited in claim 7 wherein said pitch attitude signal providing means and said vertical speed signal providing means include means for providing said signals independently of the airmass surrounding the aircraft.

9. A pitch guidance system for an aircraft, comprising:
   means for providing a pitch angle reference signal representative of the optimum pitch angle for maximum climb of the aircraft;
   means for providing a signal representative of the altitude of the aircraft;
   means for providing a signal representative of the vertical speed of the aircraft;
   means for providing a signal representative of the pitch angle of the aircraft;
   means responsive to said pitch angle signal and said pitch angle reference signal for providing a pitch angle guidance signal for maneuvering the aircraft; and
   means responsive to said itch angle reference signal, said altitude representative signal and said vertical speed representative signal for modifying said pitch angle reference signal in response to said pitch angle reference signal, said altitude signal and said vertical speed signal.

10. A pitch guidance system as recited in claim 9 wherein said pitch angle reference signal modifying means includes means for increasing said pitch angle reference signal upon the occurrence of a vertical speed signal representative of descent of the aircraft.

11. A pitch guidance system as recited in claim 10 wherein said pitch angle reference signal modifying means includes means for controlling the amount the pitch angle reference signal is increased is reduced as the altitude representative signal increases.

12. A pitch guidance system as recited in claim 11 further including means for providing a stall warning signal, wherein said pitch angle reference signal modifying means is responsive to said stall warning signal to reduce the pitch angle reference signal upon the occurrence of a stall warning.

13. A pitch guidance system for an aircraft, comprising:
   means for providing a pitch angle reference signal representative of the optimum pitch angle for maximum climb of the aircraft;
   means for providing a signal representative of the altitude of the aircraft;
   means for providing a signal representative of the pitch angle of the aircraft;
   means responsive to said pitch angle signal and said pitch angle reference signal for providing a pitch angle guidance signal for use in maneuvering an aircraft; and
   means responsive to said altitude signal and said pitch angle reference signal for modifying said pitch angle reference signal in accordance with the altitude signal.

14. A pitch guidance system as recited in claim 13 wherein said pitch angle reference signal modifying means includes means for decreasing the pitch angle reference signal upon an ascent of the aircraft above a predetermined altitude above ground.

15. A pitch guidance system as recited in claim 14 wherein said pitch angle reference signal is representative of a pitch angle on the order of 13 to 15 degrees and wherein said pitch angle reference signal is decreased above altitudes above one hundred feet above the ground.

16. A pitch guidance system as recited in claim 14 wherein said system includes means for providing a signal representative of the vertical speed of the aircraft and wherein said pitch angle reference signal modifying means includes means for decreasing the pitch angle reference signal upon the occurrence of a vertical speed signal indicative of an ascent of the aircraft.

17. A pitch guidance system as recited in claim 14 further including means for providing a signal representative of the vertical speed of the aircraft and wherein said pitch angle reference signal modifying means includes means for increasing the pitch angle reference signal upon the occurrence of a vertical speed signal indicative of a descent of the aircraft.

18. A guidance system for aircraft comprising:
   means for providing a pitch angle reference signal;
   means for providing a signal representative of the pitch angle of the aircraft;
   means for providing a stall warning signal;
   means responsive to said pitch angle signal and said pitch angle reference signal for providing a pitch guidance signal for manuevering an aircraft; and
   means responsive to said pitch angle reference signal and said stall warning signal for modifying said pitch guidance signal in accordance with said stall warning signal.

19. A guidance system as recited in claim 18 wherein said pitch guidance signal modifying means includes means for reducing the value of the pitch guidance signal upon the occurrence of a stall warning signal.

20. A guidance system as recited in claim 18 further including means for receiving a signal representative of the position of the flaps of the aircraft and wherein said pitch guidance signal modifying means includes means responsive to the signal representative of the position of the flaps of the aircraft for altering the pitch guidance signal.

21. A guidance system as recited in claim 20 further including means for providing a signal representative of the aircraft type and wherein said modifying means includes means responsive to said aircraft type signal for modifying said pitch guidance signal in accordance with the aircraft type.

22. A method for providing pitch guidance to the pilot of an aircraft comprising:
   monitoring pitch angle of the aircraft relative to a reference pitch value and providing a guidance signal to the pilot in response to the difference therebetween; and
   monitoring the occurrence of a stall warning and altering the value of the guidance signal upon the occurrence of a stall warning.

23. The method recited in claim 22 wherein the value of the guidance signal is reduced upon the occurrence of a stall warning.

24. An aircraft guidance system comprising:
means for providing a pitch angle reference signal representative of the optimum pitch angle for maximum climb of the aircraft during a wind shear;
means for providing a stall warning signal;
means for providing a signal representative of pitch angle of the aircraft;
means responsive to said pitch angle reference signal and said pitch angle representative signal for providing a pitch guidance signal;
means responsive to said stall warning signal for modifying the pitch angle reference signal to provide a modified stall warning signal upon the occurrence of a stall warning; and
means responsive to the pitch angle signal and the modified pitch angle reference signal for providing pitch guidance information to the pilot during a wind shear.

25. An aircraft guidance system as recited in claim 24 wherein said pitch angle signal providing means includes a vertical gyro.

26. An aircraft guidance system as recited in claim 24 wherein said pitch angle reference signal modifying means includes means for reducing said pitch angle reference signal upon the occurrence of a stall warning.

27. An aircraft guidance system as recited in claim 26 wherein said pitch angle reference signal is incrementally decreased as long as the stall warning is present.

28. An aircraft guidance system as recited in claim 27 wherein said pitch angle reference signal is decrease in increments of 2 degrees.

29. An aircraft guidance system as recited in claim 28 wherein said pitch angle reference signal is increased upon the cessation of the stall warning.

30. An aircraft guidance system as recited in claim 29 wherein said pitch angle reference signal is incrementally increased.

31. An aircraft guidance system as recited in claim 24 wherein said pitch guidance information providing means includes means for comparing the pitch angle representative signal with the modified pitch angle reference signal to provide said pitch guidance information.

32. An aircraft guidance system as recited in claim 31 wherein said pitch guidance information is determined by the difference between the pitch angle representative signal and the modified pitch angle reference signal.

* * * * *